United States Patent [19]

Patterson et al.

[11] Patent Number: 5,585,135
[45] Date of Patent: Dec. 17, 1996

[54] METHOD FOR EXTENDING THE SHELF-LIFE OF CHOCOLATE CONFECTIONERY PRODUCTS CONTAINING PEANUTS AND THE PRODUCT PRODUCED THEREFROM

[75] Inventors: Gordon Patterson; David A. Stuart, both of Hershey; Paula Thomas, Harrisburg; Douglas W. Lehrian, Hummelstown, all of Pa.

[73] Assignee: Hershey Foods Corporation, Hershey, Pa.

[21] Appl. No.: 519,085

[22] Filed: Aug. 24, 1995

[51] Int. Cl.$^6$ ........................................ A23G 1/00
[52] U.S. Cl. ............................... 426/660; 426/632
[58] Field of Search ................................ 426/660, 632

[56] References Cited

U.S. PATENT DOCUMENTS

| | | | |
|---|---|---|---|
| 4,010,284 | 3/1977 | Bellow | 426/660 |
| 4,049,833 | 9/1977 | Gannis | 426/632 |
| 4,364,967 | 12/1982 | Black | 426/632 |
| 4,466,987 | 8/1984 | Wilkins | 426/632 |
| 4,504,513 | 3/1985 | Black | 426/632 |
| 4,938,987 | 7/1990 | Gannis | 426/632 |
| 5,094,874 | 3/1992 | Zook | 426/632 |
| 5,164,217 | 11/1992 | Wong | 426/632 |
| 5,240,726 | 8/1993 | Zook | 426/632 |
| 5,290,578 | 3/1994 | Passey | 426/632 |
| 5,362,505 | 11/1994 | Hsieh et al. | |

FOREIGN PATENT DOCUMENTS 2020564  1/1991  Canada.
2617675  1/1989  France.

OTHER PUBLICATIONS

Swern 1979 Bailey's Industrial Oil & Fat Products vol. 1 4th Ed. Wiley Interscience Publication New York pp. 363–368.
Morgan 1982 Chocolate and Candy Cookbook Arco Publishing Inc New York pp. 30,31,33,35,37,38,152,155,158, 159,170,172,173.
A. J. Norden, "Variability in Oil Quality Among Peanut Genotypes in the Florida Breeding Program", 1987, pp. 7–11.
S. F. O'Keefe, "Comparison of Oxidative Stability of High and Normal–Oleic Peanut Oils", 1993, vol. 70, pp. 489–492.
Dr. Giovanni Bigalli, "Usefulness and Limitations of Fatty Acids Distribution Determination in the Confectionery Industry", *35th P.M.C.A. Production Conference*, 1981, pp. 82–86.
William W. Christie, "Lipid Analysis", 1982, 2nd ed., pp. 22.
J. C. Braddock, et al., "Flavor and Oxidative Stability of Roasted High Oleic Acid Peanuts"., 1995, *Jrnl. of Food Science*, vol. 60, pp. 489–493.

*Primary Examiner*—Carolyn Paden
*Attorney, Agent, or Firm*—Scully, Scott, Murphy & Presser

[57] ABSTRACT

The present invention is directed to chocolate confectionery containing roasted high oleic acid peanuts, in whole, or in part, and a process for making same.

33 Claims, No Drawings

METHOD FOR EXTENDING THE SHELF-LIFE OF CHOCOLATE CONFECTIONERY PRODUCTS CONTAINING PEANUTS AND THE PRODUCT PRODUCED THEREFROM

FIELD OF THE INVENTION

The present invention relates to chocolate confectionery products containing peanuts, either whole or in part, having high oleic acid content.

BACKGROUND OF THE INVENTION

Candies, confections and snack foods are consumed for their eating enjoyment. The food properties responsible for giving the enjoyable sensation, the tastes, aromas and textures are often measured as a group often referred to as the organoleptic property of a food composition. This global measurement can be defined by quantitative sensory value, defined as likability or acceptability. The value is the sum total of sensory perception of the food as determined by trained experts who taste the food. While the measurement of likability or acceptability may appear subjective, when done under controlled conditions and with scientific methods, these measures can be determined with great precision and accuracy. In the food industry, the overall sensory likability or acceptability is used as a prediction of the commercial success of a new product and is the basis for multi-million dollar decisions regarding the product introduction.

The fat and oil components of most confectionery products greatly influence the perception of quality and overall likability or acceptability. The fats and oils become part of the system as a constituent of raw materials, such as cocoa beans, milk and the like. When nuts, such as peanuts, are added to the confectionery, the fats and oils therein also become part of the system.

The peanuts, when added to chocolate confectioneries, are usually processed, i.e., roasted. Thus, chocolate confectioneries which contain peanuts contain the fat and oil mixture normally found in the chocolate as well as the fat and oil normally found in roasted peanuts.

Roasting in air or oil is a necessary part of peanut processing and provides a taste which the public enjoys in peanut-containing chocolate confections. Without roasting, the peanuts in these products would taste beany.

Concomitant with roasting are various consequences, some beneficial, others detrimental.

Besides providing for the roasted peanut flavor, roasting serves to destroy enzymes, which, if left intact, would cause enzymatic oxidation of the product. For example, lipoxygenase, which directly adds molecular oxygen to unsaturated fatty acids and helps promote oxidation of the oil, is rapidly destroyed by roasting. So are other hydrolyric enzymes. A thorough roasting is essential to denature harmful enzymes.

On the other hand, roasting has negative consequences. For example, unroasted peanuts contain chemicals having anti-oxidant properties which act to protect the oil. However, in the roasting process, these chemicals become oxidized.

In addition, roasting also destroys potentially beneficial enzymes, such as superoxide dismutase, which is thought to act as a natural antioxidant.

Roasting also disrupts cellular compartmentalization of the oil within the peanut. Oil is normally found in oil bodies. These are expanded and agglomerated during the roasting process. This allows the oil to come in contact with the myriad of other chemicals found within the peanut-some chemicals of biological origin and some from other sources. It also delocalizes the peanut oils, such that migration into other phases of the product composition can more readily occur.

Processed peanut-containing confections suffer from a rapid decline in acceptability over time compared with confections which do not contain peanuts. For example, chocolate candies containing peanuts, peanut brittle or peanut butter can have shelf lives of approximately eight months or less. By comparison, the shelf life of solid milk chocolate is beyond one year. Processed peanuts turn rancid in these foods, as a result of oxidation, causing the chocolate confectionery product to have an unpleasant taste.

The modes of product failure in these processed peanut containing products are multiple. The loss of the characteristic fresh-roasted peanut taste and aroma is termed flavor fade. Associated with flavor fade is the general loss of desirable roasted nut flavor and the reappearance of unpleasant raw beany flavor chemicals. These changes are thought to result from the oxidation or hydrolysis of fresh roasted peanut flavors. Coincident with product aging is the direct oxidation of the peanut oil. The oxidation of oils results in the characteristic appearance of cardboardy, painty, fishy or rancid flavors which occur as the oil is oxidized to peroxides which decompose into secondary oxidation products, such as hydrocarbons, aldehydes and other strongly flavored chemicals. The combination of flavor fade and the oxidation of oils reduces the product likability or acceptability and provides the consumer with an unpleasant eating experience to the point where products are no longer salable. Hence, a short shelf life is generally characteristic for processed peanut products. When these out of date goods are returned, they must be destroyed. This short shelf life also results in generally high rates of consumer complaints for these products because off-flavors develop at a faster rate in products which contain processed peanuts.

Chocolate products contain a relatively high level of fats and oils. In these chocolate confections containing processed peanuts, because the oil based chemicals causing off-flavors in the peanut are more readily oxidized, the prospects for cross-contamination of the chocolate fats and oils is markedly enhanced.

Thus, the problems described hereinabove with chocolate confections containing peanuts have plagued and continue to plague the confectionery industry. The chocolate industry is actively trying to find solutions, but unfortunately, no one has been successful in finding a solution for prolonging the shelf life of confections containing peanuts. The search still continues for a viable solution.

There are various means that have been utilized to avoid oxidative rancidity which have been implemented in peanut products, including peanut containing snacks.

For example, refining the oil to remove pro-oxidant metal cations such as $Cu^{2+}$, $Cu^{1+}$, or $Fe^{2+}$, $Fe^{+3}$ that are present in the peanut oil, the addition of antioxidants, deaeration of the oil, nitrogen flushing, storage under inert gas, vacuum packaging and hydrogenation are all known to improve the keeping qualities of peanut oil. Options for improving the shelf life of peanut butter are somewhat more limited, but include deaeration, inert gas flushing and vacuum packing. With whole or substantially intact processed peanuts, the range of options to extend shelf life narrows further. The main means for extending the shelf life of peanut products are deaeration, vacuum packing and inert gas flushing.

However, these means are not viable or practical to chocolate confectioneries containing peanuts. Refining of oils removes all but the most subtle of flavors and results in a bland product virtually free of the flavors one would recognize in peanut confections and snacks. In confections and other processed peanut snacks, the removal of metal ions and hydrogenation are not options because these strategies require the removal of the oil from the peanut followed by reincorporation of peanut oil into the peanut. Oil removal destroys the flavor, texture and shape of the peanut. Hydrogenation changes the flavor and mouthfeel of oils. In addition, with candies and certain snacks, nitrogen flushing, deaeration and vacuum packing have practical limitations. These strategies rely upon a hermetically sealed, oxygen impermeable packaging. The current state of packaging of confections and other snacks often do not allow for the added expense of barrier packaging materials nor do they permit the slower production speeds required for hermetic sealing. Obviously, processed peanut-containing confections cannot be packed in glass, plastic or cans as are typical for peanut oil or peanut butter—the cost of the package and its disposal after use are much too expensive. For the present, virtually all processed peanut-containing confections are packaged in oxygen permeable packages.

The present inventors, however, have provided a solution to the problem; they have developed a chocolate confectionery article containing peanuts having a high oleic content. These chocolate confections have a continuous fat based chocolate phase and a discontinuous peanut phase in which the peanut therein consists of high oleic acid peanuts. The inventors thus have replaced the normal peanuts found in chocolate confectioneries with peanuts having high oleic acid content. As the inventors have discovered, the oil of these peanuts having a high oleic acid content extend the shelf life of these chocolate confections because they contain a lower amount of unsaturated fatty acid in the oil.

Typical peanuts contain an oil composition which is summarized below for Sunrunner peanuts as representative:

| Fatty Acid<br>(# of Carbon Atoms: # of double bonds) | % of Total Fat |
| --- | --- |
| 16:0 | 9.40 |
| 16:1 | 0.07 |
| 17:0 | 0.07 |
| 17:1 | 0.07 |
| 18:0 | 1.95 |
| 18:1 | 49.05 |
| 18:2 | 30.40 |
| 18:3 | 0.00 |
| 20:0 | 1.26 |
| 22:0 | 3.77 |
| 22:1 | 0.10 |
| 24:0 | 2.39 |

Oxidation of peanut oil requires oxidation of the double bonds in peanut oil. Since peanut oil contains a relatively high complement of linoleic acid (18:2), a polyunsaturated fatty acid, it is inherently more unstable than many other vegetable oils which do not contain as much linoleic acid. Peanut oil is especially susceptible to oxidative rancidity due to the amount of unsaturation contained therein.

Thus, in order to reduce the oxidative rancidity of the peanuts in chocolate confections, the present inventors developed a peanut containing chocolate confection in which the amount of linoleic acid is dramatically reduced and the amount of oleic acid is significantly increased so that the peanut contains a high oleic acid content.

High oleic acid-containing peanuts are known. Norden et al. in an article entitled "Variability in Oil Quality Among Peanut Genotypes in the Florida Breeding Program," (1987) *Peanut Science* 14:7–11 (hereinafter "Norden et al."), discovered a naturally occurring mutant of Spanish Peanut. This peanut was characterized by having a highly modified oil composition in which the linoleic acid content was reduced to less than 4% compared to approximately 30% for typical runner peanuts. Concomitantly, the oleic acid content of this peanut mutant increased to over 78% compared to the 48% to 50% typically seen in runner peanuts. This new line of peanuts was designated line F435-2--1 and F435-2--2.

Peanuts of either Norden's mutant F435 or a genetic derivative were used by O'Keefe et al. as described in the article entitled "Comparison of Oxidative Stability of High and Normal Oleic Peanut Oils, (1993) *JAOCS* 70(5):489–492, to produce a high oleic peanut oil. The oil used by O'Keefe et al. was solvent extracted from unroasted peanuts, refined by caustic refining, and water washed to remove undesirable compounds from the oil. This oil would be expected to be bland and flavorless. This oil was almost entirely composed of triglycerides and is a much more defined and predicmable food system than whole, roasted peanuts. The high oleic peanut oil was found to be more resistant to oxidation than the oil from normal peanuts.

The F435 line was also used by Cammar et al. as described in Canadian Patent Application No. 2020564. The investigators therein described peanut butter as fine particles of peanut suspended in a continuous oil phase. Cammar et al. recognized that to produce the desired product texture, spreadability, mouthfeel and other desired properties of peanut butter, it was necessary to finely grind the roasted peanuts to release the peanut oil and to reduce the intact peanut particles to very small sizes. They found the resulting peanut butter to be more stable than the peanut butter made from regular peanuts.

Although the Canadian Patent Application suggests that the peanut butter therein could be used in "confections and snacks," there is no specific teaching or suggestion therein that the peanut butter could be used in chocolate confections. There are various types of confections, such as sugar confections, baked confections and fruit confections. Sugar confections, in turn, consist of two classes, amorphous and crystalline, which themselves are divided into several groups, e.g., hard candy, brittles, taffies, toffees, jellies, gums, fondants, creams, pralines, fudges, chocolates, nougats, pressed candy, marzipan, pastes, panned candies, and the like. The present invention is drawn to chocolate confections which fall in the category of crystalline which are fat-based, having a continuous fat-based chocolate phase and a discontinuous peanut phase.

Furthermore, for many processed peanut confections and snacks, the deliberate release of peanut oil, as taught in the Canadian Patent Application, is highly undesirable. In roasted peanut chocolate confections, the release of peanut oil promotes fat bloom in chocolate, softens the texture of chocolate, can cause puddling of free oil and will result in more rapid oxidation of an already short shelf life product. In whole roasted peanuts, release of free oil will cause objectionable surface appearance and textural changes in the food. Of course when chocolate confections are prepared containing chopped peanuts or parts of the peanuts, there will be some release of peanut oil into the chocolate. However, the present invention minimizes the interaction of linoleic acid in the peanut oil with the chocolate, thereby reducing the amount of oxidation of same.

Furthermore, although the oil containing a higher amount of oleic acid may be more stable, there is no predictability of the stability of the confection based upon oil compositions. As Yuki, et al., in an article entitled "Oxidative Deterioration of Roasted Peanuts", in *Journal of Japanese Society of Food Science and Technology* 1978, 5, 293–301, teach, there is no predictability of whole peanut stability based upon oil composition. Since the peanut is being placed in a complex matrix such as chocolate confections, the stability of the peanut in this environment is totally unpredictable.

Moreover, the effect of the interaction of the high oleic acid peanut with the chocolate in the confection of the present invention is also unpredictable. For example, prior to the present invention, the effect of the release of peanut oil comprised of high oleic acid on the chocolate was unknown. The compatibility of this peanut oil with the chocolate has never been investigated. A priori, before preparing a chocolate confection containing high oleic peanuts, there is no way to predict the effect of the oil on the chocolate. It might have the same effect or have more detrimental effects on the chocolate than peanut oil made from regular peanuts.

Heretofore, prior to the present invention, no one had specifically suggested that high oleic peanuts, whole or in part, including chopped and finely divided peanuts or parts thereof or peanut butter could be used in chocolate confections, even though it has been eight years since the publication of Norden et al. When the present inventors, however, had prepared chocolate confections using peanuts of high oleic acid, they had unexpectedly found that the products were significantly more stable than the chocolate products containing regular peanuts and significantly more stable than predicted by calculation of the composite oil fatty acid composition.

SUMMARY OF THE INVENTION

Accordingly, the present invention is directed to chocolate confections containing roasted peanuts of high oleic acid content. The present invention is also directed to a process of improving the shelf life of chocolate confections containing roasted peanuts by utilizing the high oleic acid peanuts (HOAP) in the chocolate confections rather than regular peanuts. In the invention, the HOAP are shelled, blanched or unblanched peanuts. In combining chocolate with HOAP, a flavor and oil stability is found, which is greater than expected based on the fatty acid composition of HOAP alone.

DETAILED DESCRIPTION OF THE INVENTION

The present invention is directed to chocolate products containing a peanut with high oleic acid content. These chocolate products have a continuous fat phase (chocolate paste) and a discontinuous fat peanut phase. The chocolate surrounds the peanut, and thus the fat phase of the chocolate is interrupted by the peanut phase. The peanuts may be whole, broken, ground or split, chopped, or finely divided.

The oil of the HOAP migrates into the chocolate phase and interacts with the fat phase in the chocolate. The amount of peanut oil that migrates is dependent upon the age of the peanut in the chocolate as well as the state of the peanut. If the peanut is ground, chopped or finely divided, obviously, more peanut oil will migrate per unit time into the fat phase of the chocolate until equilibrium is reached than if the peanut were whole. Furthermore, over time, there is a greater tendency for the peanut oil to migrate and interact with the chocolate. The inventors have discovered that over time more peanut oil from the HOAP migrates into the chocolate paste than from normal peanuts. Yet, despite this greater mobility of the peanut oil from the HOAP into the chocolate matrix, the behavior of the oil from the HOAP is quite different than that of normal peanuts. There is much lower tendency of the oil of the HOAP to be oxidized and thus there is much less oxidative rancidity associated with chocolate products containing the HOAP. Moreover, these products are less susceptible to flavor fade. They are more stable and have an unexpectedly longer shelf life. Thus, the present invention utilizes a one-for-one substitution of high oleic acid peanuts for commercial peanuts, such as Runner, Virginia, Spanish or other commercial peanuts for the manufacture of chocolate confections containing peanuts. In the present invention, the HOAP are shelled, blanched and unblanched peanuts which have been roasted, and are used whole, split or chopped or finely divided or ground. These roasted HOAP are generically referred to herein as "HOAP, whole or in part".

As used herein, the term "high oleic acid peanut", (HOAP), whether in the singular or plural, refers to peanuts having a high oleic acid content as defined herein. Examples include the F435-2--1 and the F435-2--2 lines of peanuts as well as other peanuts having a high oleic acid content.

The term "oleic acid content" refers to the percentage by weight of oleic acid in the peanut oil. By "high oleic acid content" it is meant that the peanuts contain at least approximately 70% by weight oleic acid in the oil. It is preferred that the oleic acid content in the peanut oil ranges from about 70% to about 90% by weight.

Furthermore, the amount of linoleic acid in HOAP used in the present invention is drastically reduced; the linoleic acid is at most at about 10% by weight of the peanut oil with a preferred range being from about 0.1% to about 10% by weight of the peanut oil.

The ratio (w/w) of oleic acid to linoleic acid in the oil of the HOAP should be at least about 10:1. It is preferred that the ratio ranges from about 10:1 to about 40:1.

Examples of peanuts having the indicated properties are described in Norden et al. Two closely related experimental lines known as F435-2--1 and F435-2--2 were found to contain oil with about 79.91% and 79.71% oleic acid and about 2.14% and 2.29% linoleic acid, respectively. The experimental lines are indicated in the table hereinbelow:

| Oil Quality Trait | Experimental Lines 435-2--1 | Experimental Lines 435-2--2 |
| --- | --- | --- |
| Palmitic Acid (C 16:0) | 7.35% | 7.16% |
| Oleic Acid (C 18:1) | 79.91% | 79.71% |
| Linoleic Acid (C 18:2) | 2.14% | 2.29% |
| Eicosenoic Acid (20:1) | 1.81% | 1.72% |
| Oleic/Linoleic Acid Ratio | 37.34 | 34.81 |
| Iodine Value | 79.93 | 73.81 |
| Polyunsaturated to Saturated Acid Ratio | 0.138 | 0.141 |

Norden et al. further state that the F435 genotypes were derived from a seed sample received in 1959 from U. K. Bailey, former Leader, Peanut Investigations, USDA, ARS, CRD, Beltsville, Md. The original seed stock was a Florispan derivative with the possibility of a Spanish outcross ("Florispan" is a Spanish peanut grown by the University of Florida.)

The F435-2--1 and F435-2--2 peanuts are available in the University of Florida peanut breeding program, peanut collection, Department of Agronomy, Gainesville, Florida 32611.

Other examples of peanuts useful in the present invention are HOAP lines F1252 and F1250, which are lines derived from the F435 by backcrossing to Sunrunner as the recurrent parent.

More precisely, F1250 originates from a $BC_3F_3$ selection of a cross between the F435 line and a component line of Sunrunner with the latter used as the female parent. Both parents are *Arachis hypogaea*. The cross-breeding program provided a productive runner market-type peanut with at least 80% oleic fatty acid, acceptable grades and seed size and low mature pod splitting, i.e., basically incorporating the high oleic traits into Sunrunner. The original $F_1$ plant was grown in the greenhouse and backcrossed to Sunrunner, which was used as a recurrent parent in a backcrossing program. Seeds of the subsequent $BC_1F_1$ were analyzed for fatty acid composition, and high oleic (80%) fatty acid seed were planted to produce plants to again cross to Sunrunner. This process was continued in the greenhouse until a field planting was made of the $BC_3F_3$, where the single plant pedigree selection was followed until a plot bulk was made in the $BC_3F_3$ to provide seed for yield testing of F1250. The F1250 has somewhat larger seed size and superior oil chemistry compared to the "Florunner" as shown by the data shown in the following Table.

| Entry | % TSMK** | 100 Seed Weight (g) | % Oleic Acid in Oil of Peanut | % Split of Pods | Pod Yield (#/A) |
| --- | --- | --- | --- | --- | --- |
| F1250 | 79.4 | 67.3 g | 80.2 | 5.4 | 4018 |
| Florunner | 81.4* | 65.7 g | 53.9 | 9.0 | 3727 |

*Sound mature seed that ride a 16/64 × 3/4 inch screen line.
**TSMK = total sound mature kernels.

The F1252 is a sister line of F1250 and is made from the same $BC_3F_4$ population described hereinabove.

The peanuts obtained from these samples were roasted in oil or air using technique commonly utilized in the peanut industry. To avoid oxidation, if not used in a short period of time, they are flushed with an inert gas, such as nitrogen so as to reduce the oxygen level to less than or equal to about 2% by volume.

Before being mixed or placed in contact with the chocolate, the peanuts may be ground to the appropriate size. As indicated hereinbelow they are blended with chocolate paste.

The chocolate utilized in the present invention is that normally used in chocolate confectionery products. Obviously the ingredients utilized are the ones normally found in these chocolate products.

The most popular chocolate or chocolate candy consumed in the United States is in the form of sweet chocolate or milk chocolate. Milk chocolate is a confection which contains nonfat milk solids, milk fat, chocolate liquor (or other source of cocoa butter), a nutritive carbohydrate sweetener, cocoa butter and may include other optional ingredients such as emulsifiers and flavorings and other additives. Nutritive carbohydrate sweeteners may be any of those typically used in the art and include, but are not limited to, sucrose, dextrose, fructose, lactose, maltose, glucose syrup solids, corn syrup solids, invert sugar, hydrolyzed lactose, honey, maple sugar, brown sugar, molasses and the like. The sugar may be completely or partially substituted with a sugar alcohol. Suitable sugar alcohols include sorbitol, xylitol, mannitol, isomalt, lactitol, maltitol and mixtures thereof. In addition, the sugar or sugar alcohol can be completely or partially substituted with a high potency sweetener. These high potency sweeteners include, but are not limited to aspartame, saccharin, alitame, thaumatin, dihydrochalcones, cyclamates, stevioside, glycyrrhizins, synthetic alkoxy aromatics, such as dulcin and P-4000, sucralose, suosan, miraculin, monellin, acesulfame-K, peptide amino acid based sweeteners such as derivatives of aspartyl malonate esters, succinanilic acid, gemdiaminoalkanes, and the like. (When high potency sweeteners are used, it is desirable to include bulking or bodying agents, such as nondigestible carbohydrates, e.g., polydextrose and the like.)

Emulsifiers are those typically used in the art and include, but are not limited to lecithin, sorbitan monostearate, sorbitan tristearate, polysorbate 60, 65, and 80, DATEM©, sucrose partial esters and the like.

Sweet chocolate differs from milk chocolate in that it requires more chocolate liquor and limits the amount of milk solids. Semisweet chocolate requires at least 35% by weight chocolate liquor and is otherwise similar in definition to sweet chocolate. Commonly known dark chocolate, generally containing only chocolate liquor, a nutritive carbohydrate sweetener and cocoa butter, is by definition either a sweet chocolate or semisweet chocolate. Buttermilk chocolate and skim milk chocolate differ from milk chocolate in that the milk fat comes from various forms of sweet cream buttermilk and skim milk, respectively, and in the case of skim milk, the total amount of milk fat is limited to less than the minimum for milk chocolate. Mixed dairy product chocolates differ from milk chocolate in that the milk solid includes any or all of the milk solids listed for milk chocolate, buttermilk chocolate or skim milk chocolate. White chocolate differs from milk chocolate in that it contains no non-fat cocoa solids. As used herein, the term "chocolate" denotes chocolate, baking chocolate, milk chocolate, sweet chocolate, semisweet chocolate, buttermilk chocolate, skim milk chocolate, mixed dairy product chocolate, white chocolate and non standardized chocolates, unless specifically identified otherwise.

Chocolate used in foods in the United States is subject to a standard of identity established by the U.S. Food and Drug Administration (FDA) under the Federal Food, Drug and Cosmetic Act. The U.S. definitions and standards for the various types of chocolate are well established and are found in the Code of Federal Regulations, No. 21, Part 163, Cacao Products, Apr. 1, 1994, the contents of which are incorporated herein by reference. Nonstandardized chocolates are those chocolates which have compositions which fall outside the specified ranges of the standardized chocolates.

Examples of nonstandardized chocolates result when the cocoa butter or milk fats are replaced partially or completely with other fats; or when the nutritive carbohydrate sweetener is replaced partially or completely; or flavors imitating milk, butter or chocolate are added or other additions or deletions in formula are made outside the USFDA standards of identify of chocolate or combinations of any of the above.

The chocolate utilized herein is prepared by the conventional process for the manufacture of chocolate, e.g., kneading-refining-optionally dry conching-liquid conching-tempering-moulding-cooling-packaging. The moulding step, however, may be replaced with other steps, such as enrobing, extrusion, panning, depositing, admixing, and the like.

Kneading produces a homogenous paste from sugar and other sweetening mass, cocoa paste, emulsifier, and optionally from cocoa butter and milk powder. The operation is carried out in a mechanical kneading machine. The kneading consists of intimately mixing the cocoa paste, sweetening mass and optionally cocoa butter. The kneading lasts for about 10–30 minutes and occurs at about room temperature.

Refining consists of rolling the paste, which is obtained from the kneading process, between steel rollers, conventionally used in chocolate manufacture so as to reduce the size of the particles to less than 25–30 microns. Typically, the paste is passed twice through a three-roll mill. For example, the grinding pressures may be adjusted to 15 bars for the first passage and to 20 bars for the second. The starting paste progresses towards a more or less fatty pulverulent state. As a result of the refining, a homogenous paste without fatty exudations is obtained.

The next step is conching. Conching is essential for modifying the flavor and improving the rheological characteristics of the chocolate. This operation can be carried out in a single stage (liquid conching) or in two stages (dry and then liquid conching). In dry conching, the refined powder is aerated by mechanical agitation of the powder at a temperature which is chosen as a function of the nature of the constituents of the sweetening mass.

In liquid conching, the cocoa butter which is melted beforehand, is added to the refined paste. The temperature in this step is identical to that of the dry conching step.

Typically, the duration of the conching step is a few hours to a few days. For example, dry conching may take five hours, while liquid conching may take 12 hours. The refined powder in the conching step is worked at high temperatures, at around 75°–80° C. in the case of a dark chocolate, and at around 65° C. for white and milk chocolates.

The chocolate flavor is developed during this step. By virtue of the temperature increase and the aeration of the mass used, undesirable compounds, such as aldehydes and short-chain fatty acids escape from the mass by volatilization while other flavoring compounds are formed. Furthermore, the rheology of the product changes: the powder obtained at the end of the refining progresses towards the pasty state. The insoluble particles (of sugar, cocoa, milk solids and the like) are dissociated by friction and separation of water and become rounded so as to communicate greater flowability to the paste, with a lower yield point. To further improve these characteristics, an emulsifier, such as lecithin, is added to the chocolate a few hours before the end of conching. The lecithin coats the sugar particles and emulsifies the residual traces of water to give the chocolate good flow properties which are essential for the subsequent moulding stage.

Tempering of the chocolate permits, through thermal and mechanical means, crystallization of the cocoa butter in stable β form. This is necessary for adequate contraction, good gloss and a long bloom free shelf life. For that, the chocolate paste is cooled to a temperature so as to create seed crystals of all sorts and initiate the crystallization of all crystal forms. Preferably, the paste is cooled to about 27° C., sometimes slightly less. The chocolate is then heated to a temperature of approximately 29° C., which stops the development of unstable crystals and melts existing ones. The remaining crystals are of the stable β type.

The final step in the process is dependent upon the ultimate use of the chocolate. It is in this final step that the peanut and any other inclusion is added to the chocolate paste. This step includes the standard processes that are nypically used in the confection arts, such as admixing, moulding (including shell moulding), depositing, extrusion (and co-extrusion), enrobing, panning and the like. For example, peanut, peanut biscuit, peanut in nougat, peanut in caramel or marshmallow or other peanut containing inclusion may be coated by being enrobed in chocolate. Chocolate enrobed peanut or peanut containing inclusions may also be covered with a sugar confectionery shell by panning. If, on the other hand, a chocolate bar containing peanuts is desired, then the final step is typically moulding.

The chocolate paste is heated to a slightly higher temperature than in tempering during the moulding step.

The three basic methods of moulding are block, shell and hollow moulding. In the moulding step, the chocolate is mixed with the peanuts. The mixture of peanuts and chocolate and any other flavor ingredients, including inclusions, such as caramel, nougat, raisins, or other inclusions is deposited into a depositor and the depositor places the mix in the mould. The mix is allowed to cool, and then is removed from the mould as solid pieces, which are cooled and wrapped, in accordance with conventional techniques.

The amount of roasted peanuts, as whole, split, ground, chopped or finely divided, that are added to the chocolate paste varies, depending upon the type of product produced. The amount of peanut in the chocolate confection is in accordance with industry standard. Although the amount of peanut in the chocolate confection is greater than 0% and less than 90% (w/w), typically it varies from about 5% to about 60%. If the product is a chocolate bar containing just peanuts, the amount of peanut may range from about 18% to about 42% (w/w). If other ingredients, such as other nuts, caramels, or nougat, are present, obviously the amount of peanut present is much less, typically ranging from about 10% to about 20% by weight. If the product is peanut butter cups or bar made from chopped peanuts, the amount of peanut may range from about 20% to about 60% (w/w). If the product contains a wafer topped by peanuts and enrobed by chocolate, the amount of peanut present ranges from about 5% to about 30% by weight.

The peanut containing chocolate confections may also include inclusions that are typically used in chocolate candies. They include sugar confectionery other than chocolate, baked confectionery and fruit confectionery. Examples include, but are not limited to, nougat, caramel, marshmallow, biscuits, rice, fruit, fruit pieces, as well as other nuts or seeds, (e.g. almonds, pecans, coconuts, praline and the like), baking chips, wafers, and the like. These additional inclusions are added to the chocolate containing peanut products of the present invention by conventional techniques, such as the ones described hereinabove.

Regardless of the product, however, the chocolate confections containing high oleic acid peanuts have a longer shelf life than those chocolate confections having regular peanuts. As described hereinabove, the shelf life of chocolate confections in candies such as Mr Goodbar®, Snickers®, Payday®, Reese's Peanut Butter Cup®, Goobers®, M & Ms® with Peanuts and peanut brittle have shelf lives of approximately eight months or less. On the other hand, the shelf life of a chocolate confection with high oleic acid peanuts is greater than one year. In fact, the chocolate confection containing high oleic acid peanut surprisingly had very good taste and flavor. Furthermore, when the products of the present invention were given to taste panelists about six months after their preparation, surprisingly, the chocolate confectionery made with HOAP tasted significantly better than those made with regular peanuts. As more time passed between the preparation and the tasting of the products, the difference in taste between confections containing HOAP and regular peanuts became even more pronounced, with the confections containing HOAP having a more acceptable taste.

In addition, the peanut candies of the present invention have an unexpectedly low peroxide value (PV). This is the standard measurement by the industry for determining the stability of foods containing processed peanuts. The test measures the oxidative stability, i.e., peroxide values, with the lower value signifying that the food is more stable.

Lipid chemists have developed empirical formulae which relate the degree of unsaturation to oxidizability of the refined vegetable oil.

Neff et al. in *JAOCS* 1992, 6:(2):111–118 use the equation:

$$\text{oxidizability} = \frac{0.02 \times \% \text{ oleic acid} + \% \text{ linoleic acid} + 2 \times \% \text{ linolenic acid}}{100}$$

while Farag and Hallabo, in *Chem. Mikrobiol Technol, Lebensm.* 1977 3:102–104 use the equation:

$$\text{Rate of oxidation} = \frac{\text{total saturated fatty acids} \times 0}{100} + \frac{\text{oleic} \times 1}{100} + \frac{\text{linoleic} \times 12}{100} + \frac{\text{linolenic} \times 25}{100}$$

Although these equations differ in detail, they constantly rank oils from the most to least oxidizable and give results consistent with empirical laboratory measures of lipid oxidizability such as Rancimat, Shull oven or AOM stability tests.

These equations have also been used to predict the oxidizability and/or rate of oxidation of peanuts in foods, including peanut containing chocolate candies. The results from these equations have been consistent with empirical laboratory measures. Surprisingly, the chocolate paste containing HOAP is more stable than that predicted from the above equations. This unexpected increase in stability gives the total candy greater stability than expected. In fact, the stability that has been found is an order of magnitude greater than one skilled in the art would expect.

It is to be noted, that, unless specified to the contrary, all percentages are by weight.

The invention is illustrated by the following examples.

EXAMPLE 1

HOAP line F1250, a line derived from F435 by backcrossing to Sunrunner as the recurrent parent, was roasted at 320° F. for 22 minutes to an Agtron reading of approximately 45. These peanuts were cooled to room temperature and divided into sublots that were frozen at −70° C. in oxygen impervious bags or stored at 75° F. in oxygen permeable cellophane bags. Peanuts stored at 75° F. were tasted versus a frozen control at zero time and at 7, 14, 28, 49, 70, 91, 175 days by an expert panel. Peanuts were rated for flavor notes and overall acceptability. Additional samples were used in GC headspace analysis of flavor volatiles.

High oleic acid peanuts were significantly higher in roasted peanut flavor than control peanuts in their initial evaluation and have remained so through 175 days of storage at 75° F., 50% RH.

EXAMPLE 2

Chocolate Peanut Butter Cups were made with the roasted F1250 peanuts. The peanuts were coarsely ground and mixed with milk chocolate, sugar, dextrose, salt, TBHQ and citric acid and the candy was molded into the shape of a paper cup.

In a triangle test of 23-week old Peanut Butter Cups made with regular peanuts vs. those made with HOAP peanuts, a borderline difference between the cups was reported.

21 out of 48 panelists correctly identified the odd sample, resulting in a 91% confidence of a difference between the two products.

Both control and HOAP were dry roasted under the same conditions, to a similar Agtron reading on a Proctor and Schwartz roaster.

Both cups tested were made with TBHQ.

Three sample acceptability tests, conducted four days after the triangle test, indicated that Peanut Butter Cups made with HOAP (with and without TBHQ) were significantly more acceptable than Peanut Butter Cups made with control medium runner peanuts.

EXAMPLE 3

In an exemplification of HOAP as a confectionery ingredient imparting high stability, chocolate peanut butter cups were made in accordance with that in Example 1 except the peanuts were the F435 Spanish HOAP. Dry roasted HOAP variants with and without the antioxidant TBHQ were produced as well as Control Cups made with ordinary runner peanuts and containing TBHQ. All cups were stored at 85° F. and 50% RH.

After 190 days of storage, Cups containing HOAP without TBHQ had no more pentane production than regular cups with TBHQ. At 295 days of storage, HOAP cups with and without TBHQ contained much less pentane than regular cups with TBHQ. Based on flavor evaluation, the cups containing HOAP appeared to have the same resistance to oxidative rancidity as the chocolate peanut butter cups with TBHQ.

EXAMPLE 4

A typical dark chocolate composition has the following ingredients:

| Ingredient | % (by weight) |
| --- | --- |
| Chocolate Liquor | 35–42% |
| Sugar | 46–51% |
| Cocoa Butter | 10–14% |
| Lecithin | 0.2–0.3% |
| Vanillin/Vanilla | 0.01–0.02% |
| Salt | 0.00–0.06% |

This composition is mixed with whole roasted HOAP used in example 1 and molded into a bar so that the final composition is as follows:

| | |
| --- | --- |
| Peanuts | 25% |
| Chocolate Liquor | 26.3–31.5% |
| Sugar | 34.5–23.25% |
| Cocoa Butter | 7.5–10.5% |
| Lecithin | 0.15–0.23% |
| Vanillin/Vanilla | 0.01–0.015% |
| Salt | 0.00–0.04% |

EXAMPLE 5

A typical milk chocolate composition has the following ingredients:

| Ingredient | % (by weight) |
|---|---|
| Chocolate Liquor | 10–16% |
| Milk Solids | 12–30% |
| Sugar | 40–55% |
| Cocoa Butter | 14–23% |
| Lecithin | 0.1–0.4% |
| Vanillin/Vanilla | 0.01–0.05% |
| Salt | 0.00–0.14% |

This composition is mixed with whole roasted HOAP used in Example 1 and molded into a bar so that the final composition is as follows:

| | |
|---|---|
| Peanuts | 28% |
| Chocolate Liquor | 7.92–10.8% |
| Milk Solids | 9.36–18.0% |
| Sugar | 32.4–39.6% |
| Cocoa Butter | 11.52–16.56% |
| Lecithin | 0.14–0.21% |
| Vanillin/Vanilla | 0.01–0.02% |
| Salt | 0.00–0.10% |

EXAMPLE 6

Regular peanuts and F1250 and F1252 HOAP roasted in a similar fashion were incorporated into Mr. GOODBAR®, a product consisting of whole or split blanched peanuts added to a moulded milk chocolate bar. The proportion of peanuts and milk chocolate is 28% and 72%, respectively.

At seven weeks of age, the control Mr. Goodbar and HOAP Mr. Goodbar were not distinguishable by sensory characterization in a triangle test; but at 52 weeks of age, the HOAP variants were liked significantly more than the control bars.

EXAMPLE 7

MR. GOODBAR® Miniatures that contain either roasted, chopped F1250 high oleic acid medium runner peanuts or roasted, chopped ordinary medium runner peanuts were prepared. At various intervals, 5 weeks, 14 weeks, and 21 weeks, the peroxide values of the paste of the chocolate confections were determined.

In order to analyze the GOODBAR® paste for PV, the separation was performed as follows: Twelve (1.75 oz.) bars were broken and melted in a 40° C. oven overnight in a foil-covered large glass beaker. Melted product was then pulled through a modified 60 cc. plastic syringe. The end of the syringe had been cut off and the syringe was fitted with a rimmed 30 mesh screen. In order to prevent the cocoa butter in the paste from "setting up" during pressing, the press cup and pan were warmed in the 40° C. oven for 30 minutes. The paste was stirred well and the cup was filled half full. The oil was then pressed using an automated Carver Press and the typical method for nuts. Duplicate titrations with standardized 0.01N $Na_2S_2O_3$ were run on each sample. After making appropriate corrections for the peroxidation occurring in milk chocolate, the results were tabulated and are shown in Table 1.

TABLE 1

| Peroxide Values at: | | 5 Weeks | 14 Weeks | 21 Weeks |
|---|---|---|---|---|
| Peanut Pieces | Ordinary Runner Peanut | 16.5 meq/Kg | 34.3 meq/Kg | 36.7 meq/Kg |
| | HOAP | 1.4 | 3.9 | 3.5 |
| Milk Chocolate Paste (a) | Ordinary Runner Peanut | 0.9 | 4.75 | 5.53 |
| | HOAP | 0 | 0.32 | 0.30 |
| Total Candy (b) | Ordinary Runner Peanut | 7.0 | 16.2 | 17.6 |
| | HOAP | 0.5 | 1.7 | 1.5 |

(a) - values corrected for peroxidation occurring in a peanut free milk chocolate
(b) - calculated value assuming 28% of candy weight is peanuts, and peanuts are 49% oil, 72% of candy is milk chocolate paste, which is 30% fat.

Based upon these values, the PV ratios of regular to HOAP candy and components at various times was calculated and the results are tabulated in Table 2.

TABLE 2

PV ratios (ordinary runner peanut/HOAP) of candy and components at various times

| | 5 Weeks | 14 Weeks | 21 Weeks |
|---|---|---|---|
| Nut Pieces | 11.8 | 8.8 | 10.5 |
| Milk Chocolate Paste | — (c) | 14.8 | 18.4 |
| Total Candy | 114.0 | 9.5 | 11.7 |

(c) - value cannot be calculated

The results were compared with that calculated for paste, fat and oil oxidizability and rate of oxidation by the methods of Neff et al. and Farag and Hallabo. The results are indicated in Table 3.

TABLE 3

| Sample | Neff, et al. oxidizability | Ratio of Normal peanut variant to HOAP Variant | Farag and Hallabo rate of oxidation | Ratio of Normal peanut variant to HOAP Variant |
|---|---|---|---|---|
| Mr. Goodbar with F1250; 14 wk. paste scraped | 0.038884 | 1.87 | 0.77 | 1.50 |
| Mr. Goodbar w/ordinary peanuts 14 wk. paste scraped | 0.072618 | | 1.158 | |
| Mr. Goodbar w/F1250 derobed 21 wk. paste | 0.03859 | 2.22 | 0.8047 | 1.65 |
| Mr. Goodbar w/ordinary peanuts derobed 21 wk. paste | 0.085798 | | 1.3297 | |
| Mr. Goodbar w/F1250 14 wk. paste | 0.039214 | 2.22 | 0.8093 | 1.66 |
| Mr. Goodbar w/ordinary peanuts 14 wk. paste | 0.087158 | | 1.3425 | |
| GK-7 oil | 0.293418 | 7.65 | 3.9321 | 3.55 |

TABLE 3-continued

| Sample | Neff, et al. oxidizability | Ratio of Normal peanut variant to HOAP Variant | Farag and Hallabo rate of oxidation | Ratio of Normal peanut variant to HOAP Variant |
| --- | --- | --- | --- | --- |
| F1252 oil control paste | 0.038362 0.041936 | | 1.1087 0.7654 | |

Based on the data in Table 3, one would predict, that the chocolate paste of the candy containing the high oleic acid peanut would be approximately twice as stable than that containing the regular peanut.

However, as clearly indicated by the results in Tables 1 and 2, the stability of the paste of the candy containing HOAP is significantly higher by an order of magnitude. This is quite surprising in view of the increased oil migration in the chocolate paste from the high oleic acid peanuts, as shown by the following experiment.

The method of G. Bigalli in the article entitled "Usefulness and Limitations of Fatty Acids Distribution Determination in the Confectionery Industry," in *Proceedings of the 35th Annual Production Conference, Pennsylvania Manufacturing Confectioners Association*, Drexel Hill, Pa., 1981, 82–86 was used with the following modifications:

1) 50 mg oil/fat instead of 20 mg was used.
2) No concentration step was used.
3) Pentane was used as the extractant.

Three different Miniature Mr. GOODBAR® candies were scraped on the surface avoiding peanut particles. The fat was extracted from the chocolate in modified Folch. The modified extractant is dichloromethane—methanol (2:1, V/V). The Folch reagent is evaporated and 50 mg of the fat/oil mix is taken for analysis by the Bigalli procedures.

A sample of chocolate melted away from the peanuts was also extracted according to W. W. Christie, Lipid Analysis, 2nd Ed., Pergamon Press, Oxford, England, 122(1982) and the peanut oil component measured by the Bigalli method. The results are indicated in Table 4.

TABLE 4

| | Peanut Oil Migration | | |
| --- | --- | --- | --- |
| | 5 weeks | 14 weeks | 21 weeks |
| HOAP | Not measured | 18.97% (d) 30.04% (e) | 30.04% (e) |
| Runner | Not measured | 19.81% (d) 24.35% (e) | 25.97% (e) |

(d) measured in surface scrapings
(e) measured in derobed paste

From the data it is quite apparent that the peanut oil that migrates to the milk chocolate paste behaves differently than the peanut oils in the roasted peanut pieces. It is also apparent that a greater amount of oil from the HOAP peanut migrates into the paste. Yet, as indicated by the data in Tables 1–3, the milk chocolate paste containing the HOAP oil is more stable than would be predicted by the behavior of the oil in the roasted peanut pieces. More specifically, as the data clearly show, the milk chocolate paste containing the HOAP is an order of magnitude more stable than milk chocolate paste containing regular peanuts, which is an order of magnitude greater than that which would have been predicted. This increase in stability gives the total candy significantly greater stability relative to the candy containing normal peanuts since the HOAP oil oxidizes less than the expected approximately 10:1 rate in comparison with ordinary runner peanut.

The above preferred embodiments and examples are given to illustrate the scope and spirit of the present invention. The embodiments and examples described herein will make apparent, to those skilled in the art, other embodiments and examples. These other embodiments and examples are within the contemplation of the present invention. Therefore, the present invention should be limited only by the appended claims.

What is claimed is:

1. A confectionery chocolate-peanut product comprising chocolate paste in association with a roasted peanut, in whole or in part, containing peanut oil, such that said confectionery has a continuous fat chocolate phase surrounding a discontinuous peanut phase, said peanut having an oleic acid content greater than 70% by weight of the peanut oil, and said confectionery chocolate-peanut product having an extended shelf-life relative to a confectionery chocolate peanut product containing a Sunrunner peanut.

2. The confectionery product according to claim 1 wherein chocolate paste is admixed with roasted peanut.

3. The confectionery product according to claim 1 wherein the roasted peanut is coated by the chocolate paste.

4. The confectionery product according to claim 1 in which the oleic acid content ranges from about 70% to about 90% by weight of the peanut oil.

5. The confectionery product according to claim 1 which additionally contains linoleic acid present in at most about 10% by weight of the peanut oil.

6. The confectionery product according to claim 5 in which the amount of linoleic acid ranges from about 0.1% to about 10% by weight of the peanut oil.

7. The confectionery product according to claim 1 in which the peanut oil contains at least 70% oleic acid by weight and additionally contains at least 0.1% linoleic acid by weight such that the ratio of oleic acid to linoleic acid in the peanut is at least 10:1.

8. The confectionery product according to claim 7 in which the ratio of oleic acid/linoleic acid in the peanut oil ranges from about 10:1 to about 40:1.

9. The confectionery product according to claim 1 in which the peanut is the F435 Spanish HOAP or F1250 or F1252 HOAP.

10. The confectionery product of claim 1 in which the chocolate is milk chocolate.

11. The confectionery product according to claim 1 which additionally comprises an inclusion.

12. The confectionery product according to claim 11 wherein the inclusion is a baked confectionery, fruit confectionery or a sugar confectionery other than chocolate.

13. The confectionery product according to claim 11 wherein the inclusion is nougat, caramel, fruit, fruit pieces, raisins, a nut other than peanut, marshmallow, wafer, biscuits, pralines or baking chips.

14. A method for extending the shelf-life of a chocolate confection containing roasted peanut, in whole or in part, comprising contacting said roasted peanut having an oleic acid content greater than 70% by weight of peanut oil contained therein with chocolate paste under conditions effective to form a product having a continuous chocolate phase surrounding a discontinuous peanut phase.

15. The method according to claim 14 wherein contacting comprises coating the peanut with the chocolate paste.

16. The method according to claim 15 wherein coating comprises enrobing the peanut with chocolate paste.

17. The method according to claim 15 wherein coating comprises panning the peanut with chocolate paste.

18. The method according to claim 14 wherein contacting comprises mixing said peanut with the chocolate paste.

19. The method according to claim 14 in which the oleic acid content ranges from about 70% to about 90% by weight of the peanut oil.

20. The method according to claim 14 in which the peanut contains linoleic acid in at most about 10% by weight of the peanut oil.

21. The method according to claim 20 in which the linoleic acid content ranges from about 0.1% to about 10% by weight of the peanut.

22. The method according to claim 14 in which the peanut oil contains at least 70% oleic acid by weight and additionally contains at least 0.1% linoleic acid by weight such that the ratio of oleic acid to linoleic acid in the peanut oil is at least 10:1.

23. The method according to claim 22 in which the ratio of oleic acid to linoleic acid in the peanut ranges from about 10:1 to about 40:1.

24. The method according to claim 14 in which the peanut is F435 Spanish HOAP or F1250 or F1252 HOAP.

25. The method according to claim 14 in which the chocolate is milk chocolate.

26. The method according to claim 14 wherein contacting comprises mixing the chocolate paste with the peanut.

27. The method according to claim 14 wherein contacting comprises admixing the chocolate paste with the peanut and molding the resulting product therefrom.

28. The method according to claim 27 wherein the molding is sheet molding.

29. The method according to claim 14 wherein contacting comprises making a paste of said peanut and blending said peanut paste with the chocolate paste by extrusion.

30. The method according to claim 14 wherein an inclusion is additionally added to the chocolate paste.

31. The method according to claim 30 wherein the inclusion is a baked confectionery, a fruit confectionery or a sugar confectionery other than chocolate.

32. The method according to claim 30 wherein the inclusion is nougat, caramel, marshmallow, fruit, fruit pieces, raisins, a nut other than peanut, nut paste, praline, baking chip, wafer or biscuit.

33. In a process for making a chocolate confection containing a peanut in whole or in part, which optionally includes an inclusion in which the confection is prepared by admixing, enrobing, molding, depositing, extrusion, or panning, the improvement comprising utilizing peanuts, in whole or in part, having an oleic acid content greater than 70% by weight of the oil contained therein, so as to impart to the confection an extended shelf-life relative to a chocolate confection containing Sunrunner peanuts.

* * * * *

UNITED STATES PATENT AND TRADEMARK OFFICE
CERTIFICATE OF CORRECTION

PATENT NO. : 5,585,135
DATED : December 17, 1996
INVENTOR(S) : Gordon R. Patterson, et al.

It is certified that error appears in the above-indentified patent and that said Letters Patent is hereby corrected as shown below:

Column 1, line 55: "hydrolyric" should read --hydrolytic--

Column 4, line 21: "predicmable" should read --predictable--

Column 9, line 63: "nypically" should read --typically--

Column 14, line 31: "114.0" should read --14.0--

Signed and Sealed this

Thirtieth Day of September, 1997

Attest:

BRUCE LEHMAN

Attesting Officer

Commissioner of Patents and Trademarks